(12) United States Patent
Ascari et al.

(10) Patent No.: US 12,532,905 B2
(45) Date of Patent: Jan. 27, 2026

(54) MACHINE FOR SECTIONING THE CORE OF A FRUIT

(71) Applicant: A.B.L. S.R.L., Cavezzo (IT)

(72) Inventors: Carlo Ascari, Cavezzo (IT); Daniela Ascari, Castelnuovo Rangone (IT)

(73) Assignee: A.B.L. S.R.L., Cavezzo (IT)

( * ) Notice: Subject to any disclaimer, the term of this patent is extended or adjusted under 35 U.S.C. 154(b) by 873 days.

(21) Appl. No.: 17/779,864

(22) PCT Filed: Dec. 16, 2020

(86) PCT No.: PCT/IB2020/062003
§ 371 (c)(1),
(2) Date: May 25, 2022

(87) PCT Pub. No.: WO2021/124131
PCT Pub. Date: Jun. 24, 2021

(65) Prior Publication Data
US 2023/0011242 A1   Jan. 12, 2023

(30) Foreign Application Priority Data
Dec. 20, 2019  (IT) .......................... 102019000025006

(51) Int. Cl.
*A23N 4/20* (2006.01)
(52) U.S. Cl.
CPC ...................... *A23N 4/20* (2013.01)
(58) Field of Classification Search
CPC ........................................................ A23N 4/20
USPC .............................................................. 99/549
See application file for complete search history.

(56) References Cited

U.S. PATENT DOCUMENTS

| | | | |
|---|---|---|---|
| 3,568,743 A * | 3/1971 | Dulieu ...................... | A23N 4/20 99/544 |
| 4,373,432 A | 2/1983 | Tsutsumi | |
| 4,834,795 A * | 5/1989 | Raub ........................ | A23N 4/20 99/589 |
| 7,096,777 B1 | 8/2006 | Healy | |

FOREIGN PATENT DOCUMENTS

GB        1195342 A     6/1970

* cited by examiner

*Primary Examiner* — Ibrahime A Abraham
*Assistant Examiner* — Joseph W Iskra
(74) *Attorney, Agent, or Firm* — Chrisman Gallo Tochtrop LLC (57) ABSTRACT

A machine for sectioning the core of a fruit, comprising: —gripping means (2,21), provided to assume a gripping configuration, in which they hold a fruit (F) in a cutting position, and a release configuration, in which they release the fruit (F); —a tubular blade (3), concentric to a longitudinal axis (Y), which is provided with a cutting edge (31) and is movable along the longitudinal axis (Y) between an advanced position and a retracted position; —an abutment (4), located in an opposite position to the tubular blade (3) and provided to be positioned in contact with the fruit (F) in a position opposite the tubular blade (3); —a pusher (5), arranged inside the tubular blade (3) and movable with respect to the latter between a first position, in which it is able to push the core (T) out of the tubular blade (3), and a second position, in which it enables the carrying out of the cutting stroke of the tubular blade (3).

15 Claims, 9 Drawing Sheets

MACHINE FOR SECTIONING THE CORE OF A FRUIT

The present invention relates to a machine for sectioning the core of a fruit.

In fruit processing lines, the use of machines that remove the core from a fruit which is intended for subsequent peeling and/or chopping processes is known.

In general, machines for removing cores comprise a rotating tubular blade, provided to be introduced through the fruit, especially oriented and held in position, with a substantially through stroke. When it retracts, the blade retains the core inside it, removing it from the fruit.

After the removal of the core, the fruit has a cylindrical through cavity, totally exposed to the air. Some fruits, such as pineapple, suffer from rapid oxidation inside the cavity left free from the core, assuming a darker colour. Such colour is particularly visible on the surface of the pieces into which the fruit is cut in the subsequent processing steps.

To limit the oxidation of the fruit, many processing lines envisage the re-insertion of the core into its original seat. Currently, the core is reintroduced manually or with empirical equipment, which is cumbersome and time consuming. A further disadvantage, which is worse than the previous one, comes from the poor hygiene conditions that the manual reintroduction of the core implies.

An example of a machine that facilitates the repositioning of the core is described in document U.S. Pat. No. 4,834,795. The machine described is rather complex and not suitable for fruits of different sizes. Furthermore, the positioning of the core is relatively imprecise.

The aim of the present invention is to provide a machine for sectioning the core of a fruit which allows the drawbacks summarised above to be obviated.

An advantage of the machine according to the present invention is that, as well as sectioning the core of the fruit, it also allows the core to be repositioned in its original seat, still in a precise manner, regardless of the shape and size of the fruit.

Another advantage of the machine according to the present invention is that it can operate automatically, without the need for any manual interventions on the fruit being processed.

Additional features and advantages of the present invention will become more apparent from the following detailed description of one embodiment of the invention, illustrated by way of non-limiting example in the appended figures in which.

Figure 1:
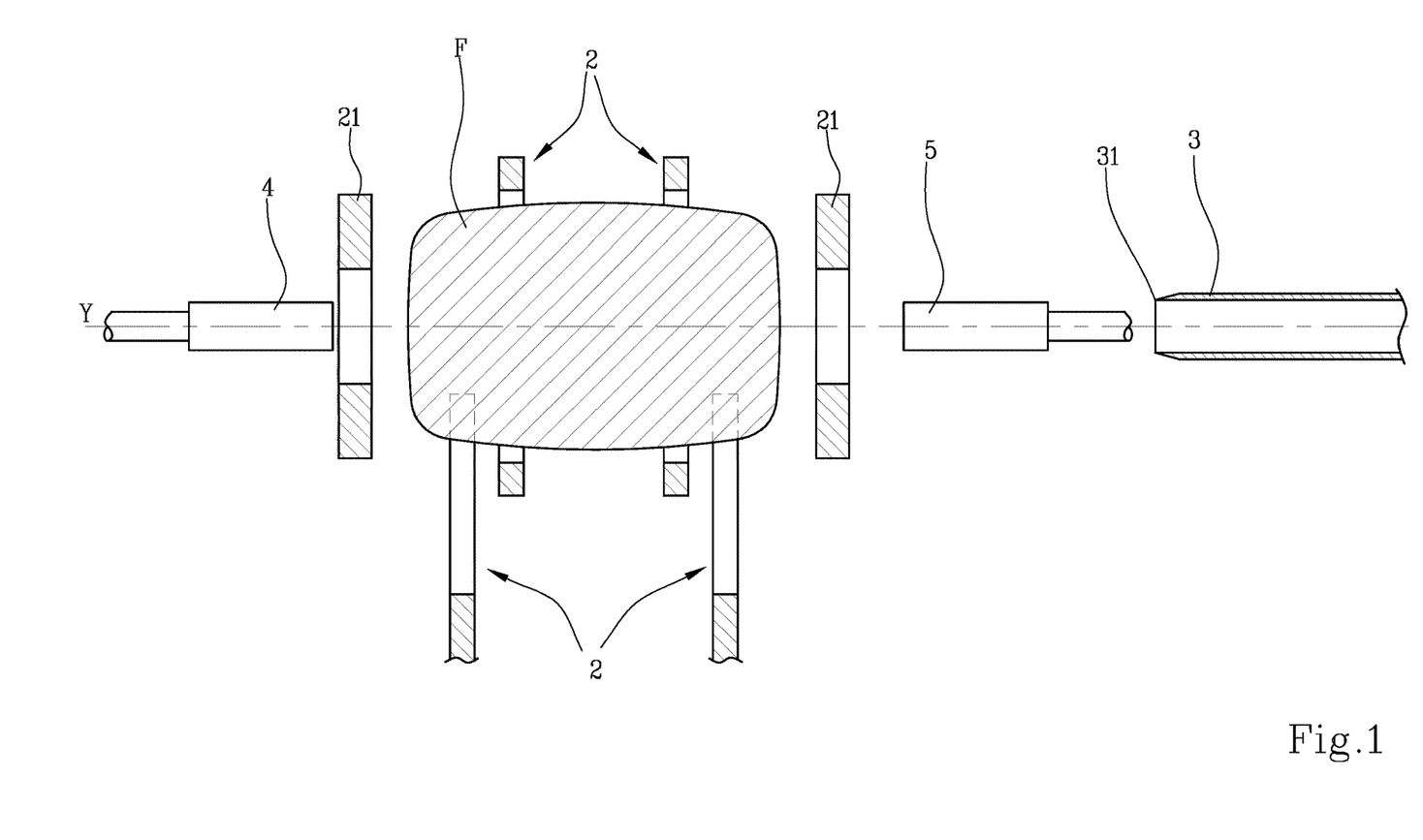
FIGS. 1 to 5 show some operating steps in succession of the machine according to the present invention.

The machine according to the present invention comprises gripping means (2,21), provided to assume a gripping configuration, in which they hold a fruit (F) in a cutting position, and a release configuration, in which they release the fruit (F). Various examples of gripping means, used in machines for the removal of the core, are known to a person skilled in the art. For example, the gripping means comprise a gripper (2), comprising two jaws that are movable towards and away from one another respectively between the gripping configuration and the release configuration. Preferably, but not necessarily, the gripping means (2,21) comprise two annular elements (21), configured to assume an inactive position (FIG. 1), in which they are distanced from the fruit, and an active position (FIGS. 2-5), in which they move towards one another and are arranged in contact with the ends of the fruit (F), preventing displacements along a longitudinal axis (Y).

The machine further comprises a tubular blade (3), concentric to the longitudinal axis (Y), which is provided with a cutting edge (31) and is movable along the longitudinal axis (Y) between an advanced position and a retracted position. In particular, the tubular blade (3) is movable in a cutting stroke from the retracted position to the advanced position, along which it crosses the fruit (F), sectioning the core (T), and in a return stroke, from the advanced position to the retracted position, along which it exits the fruit (F). In the retracted position, the blade (3) does not interfere with the fruit (F) which can be moved away towards the subsequent destinations.

Figure 8:
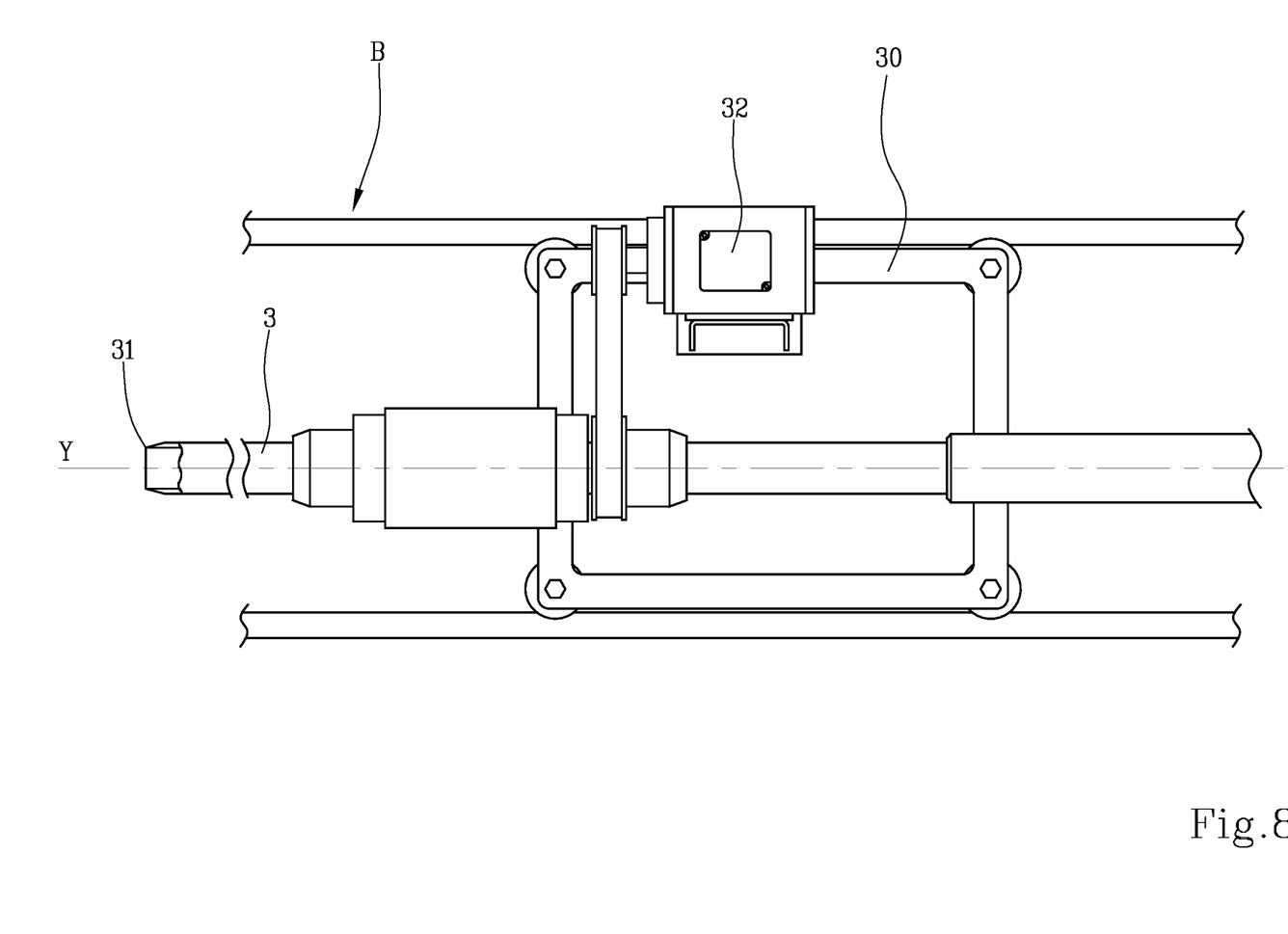
FIGS. 8 and 9 show an isolated view of two devices that form part of the machine according to the present invention.

In the solution shown, particularly in FIG. 8, the tubular blade (3) is associated with a carriage (30), which is movable along the longitudinal axis (Y). An actuator, not shown in detail as it is known to a person skilled in the art, is connected to the carriage (30) for causing the sliding thereof along the longitudinal axis (Y). The tubular blade (3) moves solidly with the carriage (30) between the advanced and retracted positions, i.e. it performs the cutting and return strokes solidly with the carriage (30). Parallel guides to the longitudinal axis (Y) are provided for guiding the motion of the carriage (30). Such guides are solidly constrained to a frame (B) of the machine. Various solutions for enabling the alternate movement of the tubular blade (3) with respect to the frame (B) of the machine are however known to a person skilled in the art.

Preferably, the tubular blade (3) is rotatable about the longitudinal axis (Y) thereof. For that purpose, the machine comprises a rotary actuator (32), kinematically connected to the tubular blade (3) to activate it in rotation about the longitudinal axis (Y). In the embodiment represented, the rotary actuator (32) is associated with the carriage (30), hence moving solidly with the tubular blade (3) along the longitudinal axis (Y). The transmission of the rotary motion to the tubular blade (3) is performed for example by means of a belt.

The machine further comprises an abutment (4), located in an opposite position to the tubular blade (3). The abutment (4) is provided to be positioned in contact with the fruit (F) in a position opposite the tubular blade (3). Substantially, the abutment (4) opposes the thrust exerted by the tubular blade (3) on the fruit (F), keeping the fruit itself (F) in a stable position with respect to the longitudinal axis (Y). This promotes the action of the tubular blade (3) and the precision of the cut performed.

In the embodiment shown, the abutment (4) is substantially concentric to the longitudinal axis (Y). Preferably, but not necessarily, the abutment (4) is movable along the longitudinal axis (Y) between an active position, in which it is in contact with the fruit (F), and an inactive position, in which it is not in contact with the fruit (F). Preferably, but not necessarily, the abutment (4) is movable with respect to the gripping means (2,21). In particular, the abutment (4) is arranged concentric with respect to the annular elements (21). Preferably, the abutment (4) is concentric and movable with respect to at least a first annular element (21), intended to enter into contact with a first end of the fruit (F).

In the in the illustrated embodiment, which is preferred but not exclusive, the abutment (4) is shaped and positioned to be able to be inserted concentrically into the tubular blade (3). In other words, the position and shape of the abutment (4) are such for which, in the advanced position, the tubular blade (3) contains within it at least an end portion of the abutment (4) intended to enter into contact with the fruit (F). For that purpose, the abutment (4) is preferably cylinder shaped, with a smaller diameter with respect to the internal diameter of the tubular blade (3). For example, the abutment (4) is shaped like a cylindrical rod, concentric to the longitudinal axis (Y).

Advantageously, a pusher (5) is arranged inside the tubular blade (3). The pusher (5) is movable with respect to the latter between a first position, in which it is at a smaller distance from the cutting edge (31) and a second position, in which it is at a larger distance from the cutting edge (31). In other words, the pusher (5) is movable away from and towards the cutting edge (31).

In the first position, the pusher (5) is able to push the core (T) out of the tubular blade (3). In the second position, the pusher (5) enables the carrying out of the cutting stroke of the tubular blade (3).

In substance, after the core (T) has been cut by the tubular blade (3) the pusher (5) keeps the core (T) in its seat while the tubular blade (3) is moved towards the retracted position.

Figure 2:
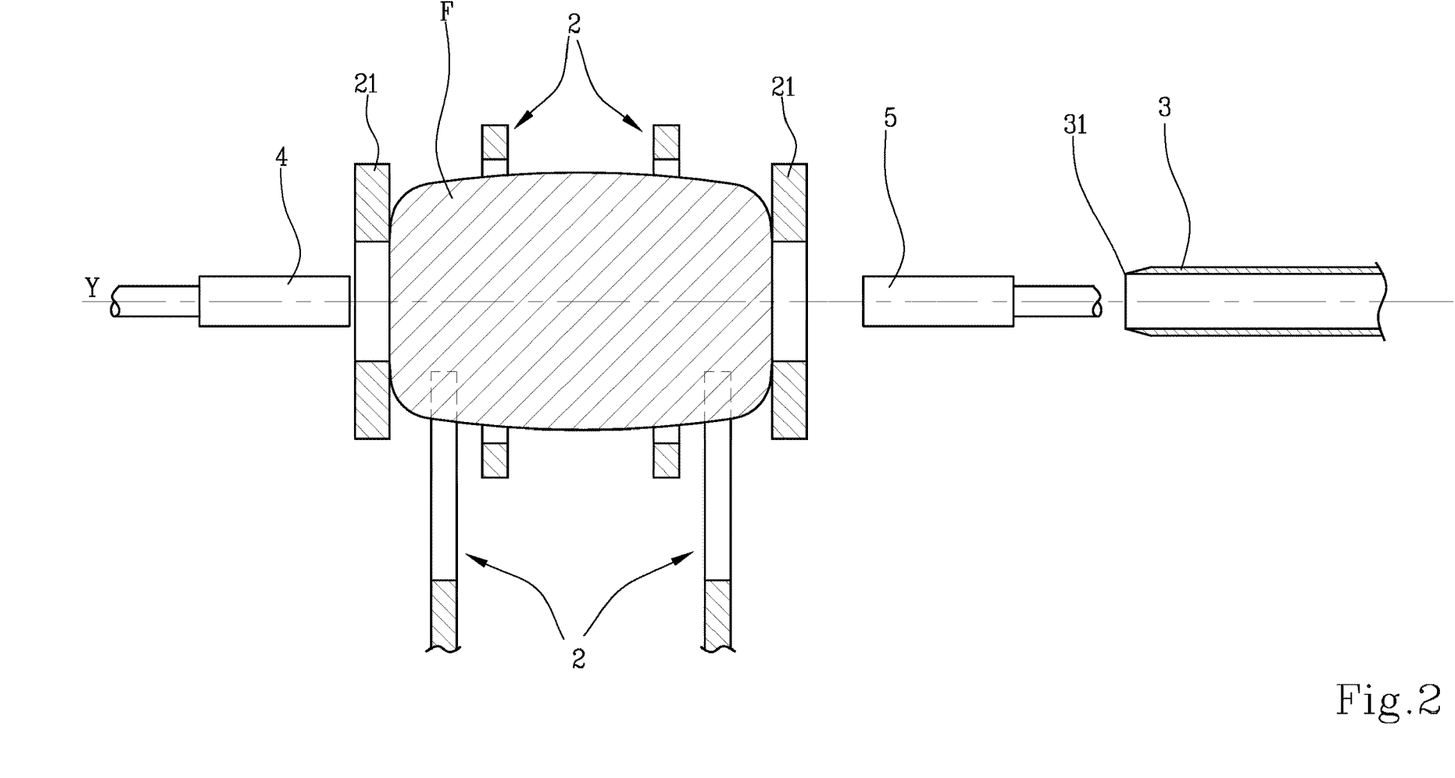
Figure 3:
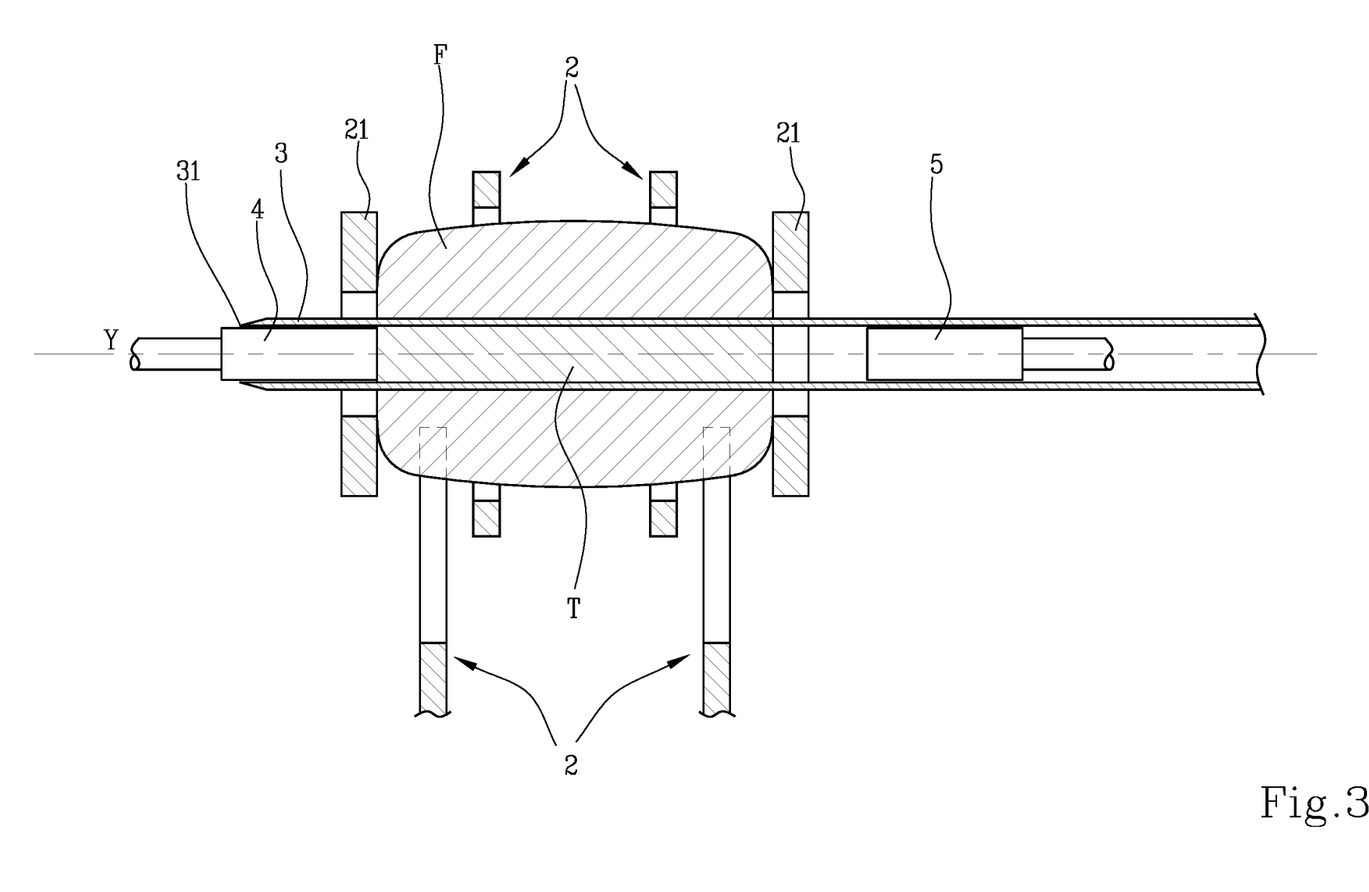
Figure 4:
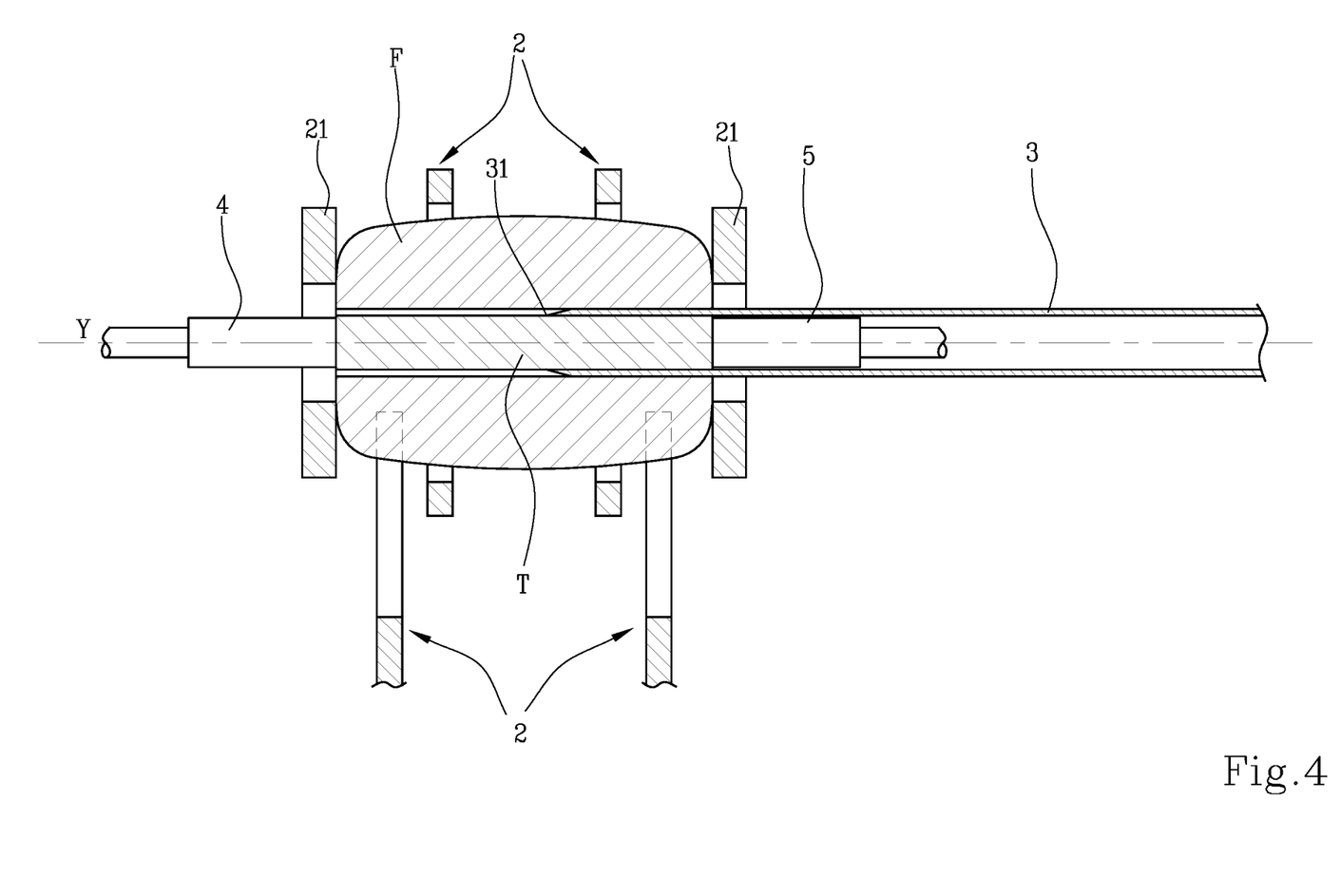
Figure 5:
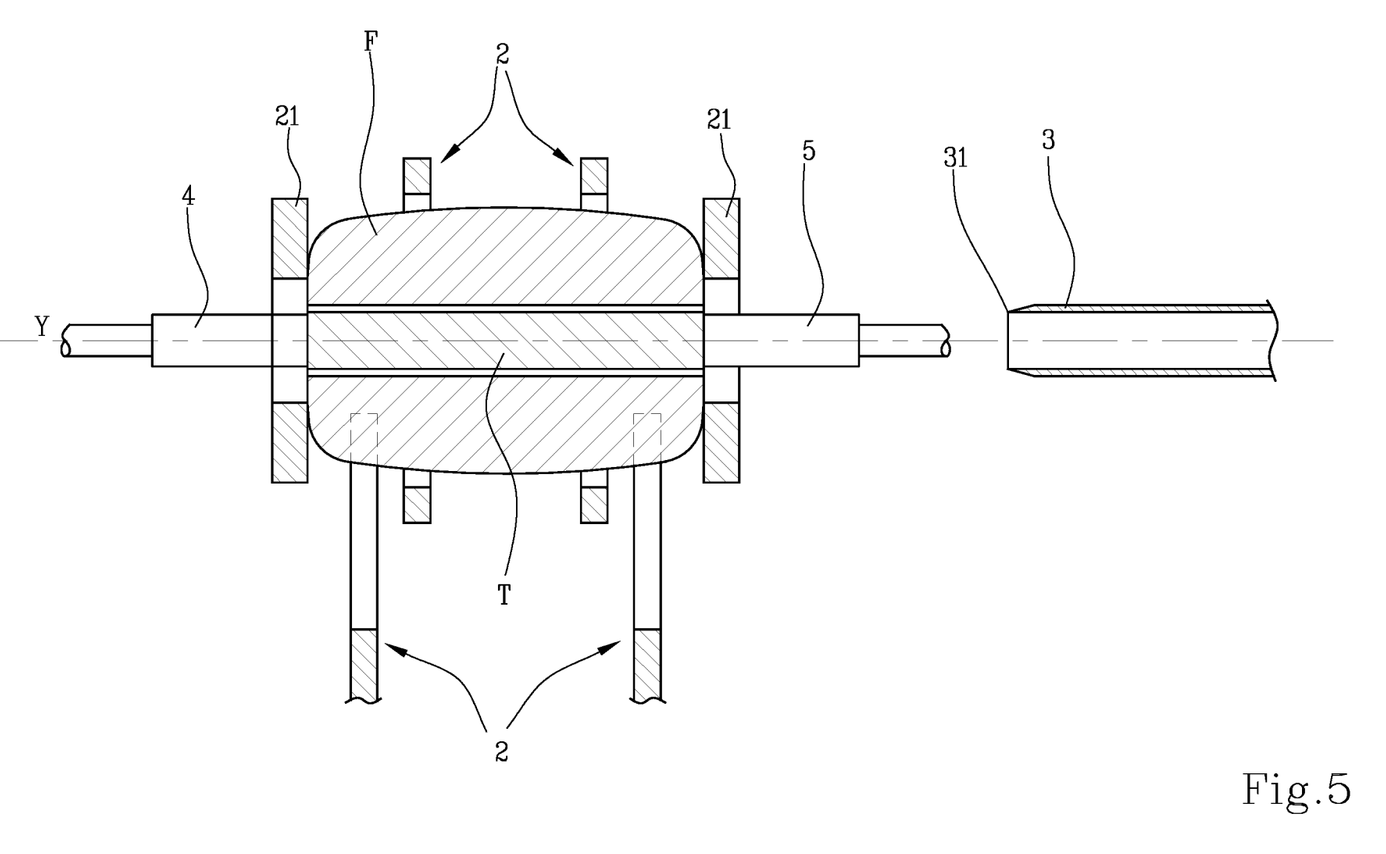
Figure 6:
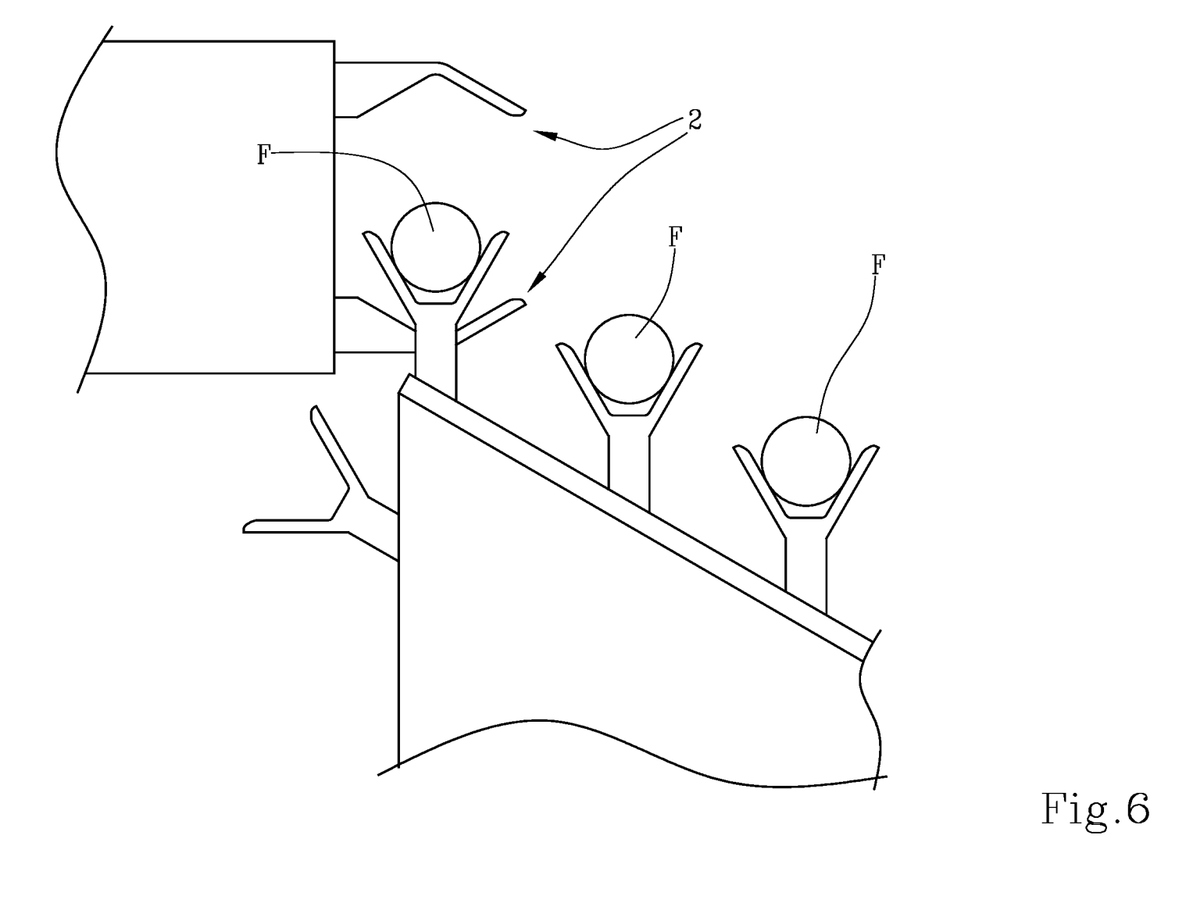
FIGS. 6 and 7 show two operating steps of gripping means (2,21) for a fruit (F)
Figure 7:
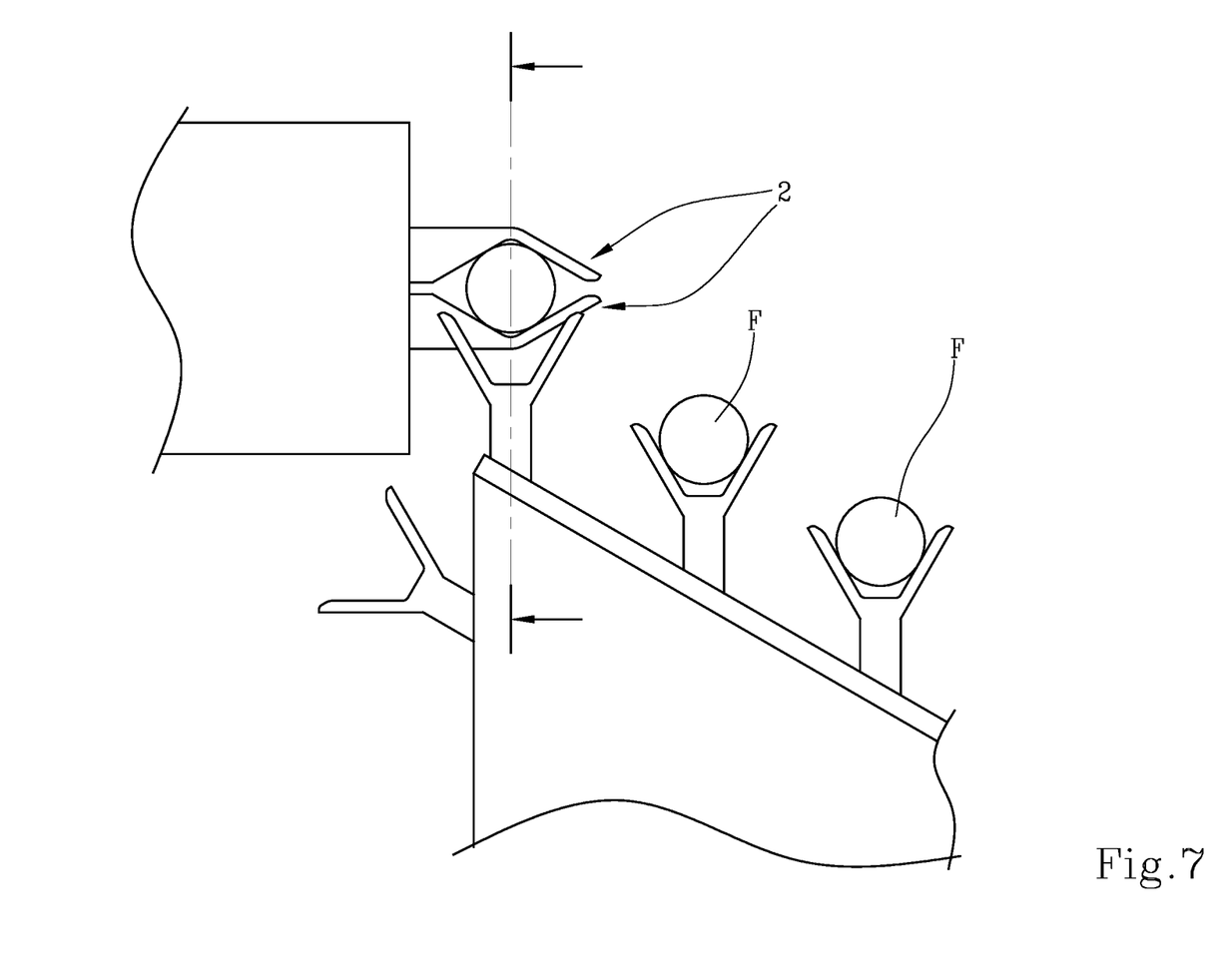

For that purpose, the operation of the machine takes place in the following ways. First, the fruit (F) is supplied to the gripping means (2,21) (FIG. 1) and is locked thereby in the cutting position (FIG. 2). Then, the tubular blade (3), placed in rotation, is moved from the retracted position towards the advanced position, entering into contact with the fruit and gradually sectioning the core (T) (FIG. 3). After the cutting stroke, the pusher (5) is moved from the second position to the first position, coming into contact with the core (FIG. 4). After reaching the first position of the pusher (5), the tubular blade (3) is moved with the return stroke from the advanced position towards the retracted position (FIG. 5). During the return stroke of the tubular blade (3), the pusher (5) is kept in the first position, for keeping the core (T) inside the fruit, substantially preventing the tubular blade (3) from dragging the core (T) with it. Once the tubular blade (3) has reached the retracted position, or has been extracted from the fruit (F), the pusher (5) returns to the second position, to enable the positioning in the machine and the processing of a subsequent fruit.

The first position of the pusher (5), i.e. the position in which the pusher enters into contact with the fruit (F), can be defined mechanically or with the aid of a sensor. In the first case, the first position can be defined, for example by regulating the stroke of the members that transmit the motion to the pusher (5). In the second case, a sensor can be located on the pusher (5) for detecting the successful contact with the fruit. In the presence of contact, the sensor sends a signal that deactivates and/or locks the actuator that confers the motion to the pusher (5).

Thanks to the presence of the pusher (5), the machine is therefore able to obtain the positioning of the core (T) in its seat, without requiring any type of manual intervention. Furthermore, the action of the pusher (5) does not significantly increase the processing times.

Before the tubular blade (3) enters into contact with the fruit (F), the abutment (4) can be brought into its active position, for contrasting the thrust exerted onto the fruit by the tubular blade (3) itself. After the cut, the abutment (4) can be brought into the inactive position, to promote the positioning of a subsequent fruit.

The synchronisation between the movements of the gripping means, the tubular blade (3), the pusher (5) and, possibly, the abutment (4), is obtained by sending synchronised commands to the corresponding activation actuators. The synchronised commands, in a way that is known in the sector, can be transmitted by an electronic and/or mechanical control module. Preferably, the actuators used for the movements of the parts listed above are pneumatic. In that case, the control module is of the electronic and/or pneumatic type.

Figure 9:
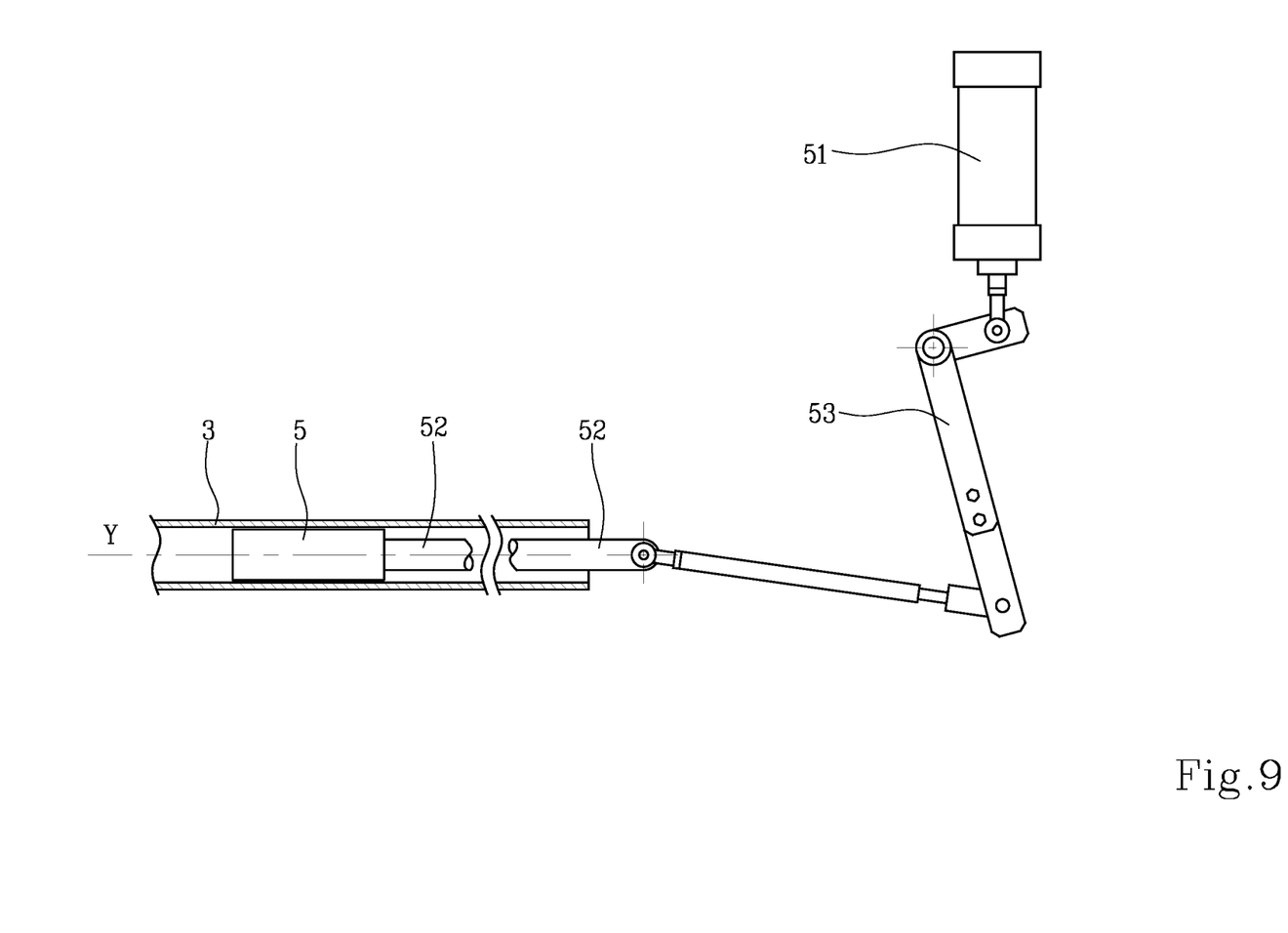

In the embodiment illustrated, particularly in FIG. 9, the pusher (5) comprises a rod (52) which projects from a rear end of the tubular blade (3) opposite the cutting edge (31). In particular, the pusher (5) is associated with a front end of the rod (52), or it is defined by the front end itself. The rear end of the rod (52) projects from the rear end of the tubular blade (3). Preferably, but not necessarily, the rod (52) is configured with a variable length, meaning the dimension measured along the longitudinal axis (Y). In practice, the variation in the length of the rod (52) enables the first position of the pusher (5) to be regulated.

The machine comprises an actuator (51), connected to the pusher (5) to activate the pusher (5) in a displacement with respect to the tubular blade (3), between the advanced position and the retracted position. As already indicated, the actuator (51) is, for example, a pneumatic cylinder. Preferably, the actuator (51) is associated with the frame (B) of the machine, i.e. it is in a stationary position with respect to the tubular blade (3). In a possible embodiment, not illustrated, the actuator (51) is located on board the carriage (30).

In the embodiment illustrated, the actuator (51) is connected to the pusher (5) by a leverage (53), pivoted to the frame (B) of the machine. In particular, the rod (52) at its rear end, is hinged to the leverage (53). The leverage (53) can be shaped in various ways, in relation to the relative positioning between the actuator (51) and the rod (52). Through the leverage (53), the linear motion of the actuator (51) is transmitted to the rod (52) through the oscillation of the leverage (53) itself. The rod (52) therefore oscillates slightly with respect to the axis (Y). The kinematic mechanism defined by the actuator (51), by the leverage (53) and by the rod (52) is particularly compact and precise in the activation of the pusher (5).

The invention claimed is:

1. Machine for sectioning the core of a fruit, comprising:
    gripping means (2,21), provided to assume a gripping configuration, wherein the gripping means hold a fruit (F) in a cutting position, and a release configuration, wherein the gripping means release the fruit (F);
    a tubular blade (3), concentric to a longitudinal axis (Y), which is provided with a cutting edge (31) and is movable along the longitudinal axis (Y) between an advanced position and a retracted position;
    an abutment (4), located in an opposite position to the tubular blade (3);
    wherein the abutment (4) is provided to be positioned in contact with the fruit (F) in a position opposite the tubular blade (3);
    wherein the tubular blade (3) is movable in a cutting stroke, from the retracted position to the advanced position, along which it the tubular blade (3) crosses the fruit (F), sectioning the core (T), and in a return stroke, from the advanced position to the retracted position, along which the tubular blade (3) exits the fruit (F); and
    a pusher (5), arranged inside the tubular blade (3) and movable with respect to the tubular blade (3) between a first position, in which the pusher (5) is at a shorter distance from the cutting edge (31), and a second position, in which the pusher (5) is at a greater distance from the cutting edge (31);
    in the first position, the pusher (5) is able to push the core (T) out of the tubular blade (3);

in the second position, the pusher (5) enables the carrying out of the cutting stroke of the tubular blade (3).

2. The machine according to claim 1, comprising a carriage (30), movable along the longitudinal direction (Y), to which the tubular blade (3) is associated.

3. The machine according to claim 1, wherein the tubular blade (3) is rotatable about the longitudinal axis (X) thereof.

4. The machine according to claim 2, wherein the tubular blade (3) is rotatable about the longitudinal axis (X) thereof, and wherein the machine further comprises a rotary actuator (32), kinematically connected to the tubular blade (3) to activate the tubular blade (3) in rotation about the longitudinal axis (X), wherein the rotary actuator (32) is associated to the carriage (30).

5. The machine according to claim 1, wherein the pusher (5) comprises a rod (52) which projects from an end of the tubular blade opposite the cutting edge (31).

6. The machine according to claim 1, comprising an actuator (51), connected to the pusher (5) to activate the pusher (5) in a displacement with respect to the tubular blade (3).

7. The machine according to claim 6, wherein the actuator (51) is associated to a frame (B) of the machine.

8. The machine according to claim 7, wherein the actuator (51) is connected to the pusher (5) by a leverage (53), pivoted to the frame (B) of the machine.

9. The machine according to claim 8, wherein the pusher (5) is pivoted to the leverage (53).

10. The machine according to claim 1, wherein the abutment (4) is concentric to the longitudinal axis (Y).

11. The machine according to claim 1, wherein the abutment (4) is movable along the longitudinal axis (Y) between an active position in which the abutment (4) is in contact with the fruit (F), and an inactive position, in which the abutment (4) is not in contact with the fruit (F).

12. The machine according to claim 1, wherein the abutment (4) is movable with respect to the gripping means (2,21).

13. The machine according to claim 1, wherein the abutment (4) is shaped and positioned so that, in the advanced position, the tubular blade (3) contains within itself at least an end portion of the abutment (4).

14. Machine for sectioning the core of a fruit, comprising:
gripping means (2,21), provided to assume a gripping configuration, wherein the gripping means hold a fruit (F) in a cutting position, and a release configuration, wherein the gripping means release the fruit (F);
a tubular blade (3), concentric to a longitudinal axis (Y), which is provided with a cutting edge (31) and is movable along the longitudinal axis (Y) between an advanced position and a retracted position;
an abutment (4), located in an opposite position to the tubular blade (3);
wherein the abutment (4) is provided to be positioned in contact with the fruit (F) in a position opposite the tubular blade (3);
wherein the tubular blade (3) is movable in a cutting stroke, from the retracted position to the advanced position, along which the tubular blade (3) crosses the fruit (F), sectioning the core (T), and in a return stroke, from the advanced position to the retracted position, along which the tubular blade (3) exits the fruit (F);
a pusher (5), arranged inside the tubular blade (3) and movable with respect to the tubular blade (3) between a first position, in which the pusher (5) is at a shorter distance from the cutting edge (31), and a second position, in which the pusher (5) is at a greater distance from the cutting edge (31);
in the first position, the pusher (5) is able to push the core (T) out of the tubular blade (3);
in the second position, the pusher (5) enables the carrying out of the cutting stroke of the tubular blade (3); and
an actuator (51) connected to the pusher (5) to activate the pusher (5) in a displacement with respect to the tubular blade (3).

15. Machine for sectioning the core of a fruit, comprising:
gripping means (2,21), provided to assume a gripping configuration, wherein the gripping means hold a fruit (F) in a cutting position, and a release configuration, wherein the gripping means release the fruit (F);
a tubular blade (3), concentric to a longitudinal axis (Y), which is provided with a cutting edge (31) and is movable along the longitudinal axis (Y) between an advanced position and a retracted position;
an abutment (4), located in an opposite position to the tubular blade (3);
wherein the abutment (4) is provided to be positioned in contact with the fruit (F) in a position opposite the tubular blade (3);
wherein the tubular blade (3) is movable in a cutting stroke, from the retracted position to the advanced position, along which the tubular blade (3) crosses the fruit (F), sectioning the core (T), and in a return stroke, from the advanced position to the retracted position, along which the tubular blade (3) exits the fruit (F);
wherein the tubular blade (3) is rotatable about the longitudinal axis (X) thereof; and
a pusher (5), arranged inside the tubular blade (3) and movable with respect to the tubular blade (3) between a first position, in which the pusher (5) is at a shorter distance from the cutting edge (31), and a second position, in which the pusher (5) is at a greater distance from the cutting edge (31);
in the first position, the pusher (5) is able to push the core (T) out of the tubular blade (3);
in the second position, the pusher (5) enables the carrying out of the cutting stroke of the tubular blade (3).

* * * * *